US012560409B1

(12) United States Patent
Schoening

(10) Patent No.: US 12,560,409 B1
(45) Date of Patent: Feb. 24, 2026

(54) LASER FILTER ANTENNA

(71) Applicant: OPTEX SYSTEMS, INC., Richardson, TX (US)

(72) Inventor: Danny Schoening, Richardson, TX (US)

(73) Assignee: OPTEX SYSTEMS, INC., Richardson, TX (US)

( * ) Notice: Subject to any disclaimer, the term of this patent is extended or adjusted under 35 U.S.C. 154(b) by 0 days.

(21) Appl. No.: 18/809,740

(22) Filed: Aug. 20, 2024

(51) Int. Cl.
*F41G 1/38* (2006.01)
*F41G 3/12* (2006.01)
*H01Q 1/22* (2006.01)

(52) U.S. Cl.
CPC ............... *F41G 1/383* (2013.01); *F41G 3/12* (2013.01); *H01Q 1/22* (2013.01)

(58) Field of Classification Search
CPC ........ G02B 5/23; G02B 5/208; G02B 25/001; H01Q 1/22; F41G 1/383; F41G 3/12
See application file for complete search history.

(56) References Cited

U.S. PATENT DOCUMENTS 3,792,916 A * 2/1974 Sarna .................... G02B 5/288 372/66
4,030,097 A * 6/1977 Gedeon .................. G01S 13/58 73/167
4,233,770 A * 11/1980 de Filippis ............... F41G 1/34 42/114
4,276,548 A * 6/1981 Lutz ..................... G01S 13/585 342/115
4,486,710 A * 12/1984 Schmidt ................. F41A 21/32 324/179
5,092,602 A * 3/1992 Witler ................ A63B 69/3623 473/199

(Continued)

FOREIGN PATENT DOCUMENTS

CN 105629481 A 6/2016
DE 102019200500 A1 7/2020

(Continued)

OTHER PUBLICATIONS

Ding et al. "A Lens Sntenna with Reconfigurable Beams for mmWave Wind Profile Radar", Sensors 2022, 22, 3148, www.mdpi.com/journal/sensors, 11 pages.

*Primary Examiner* — Peter M Bythrow
(74) *Attorney, Agent, or Firm* — David W. Carstens; Carstens, Allen & Gourley, LLP

(57) ABSTRACT

A light filter antenna configured to be used with a weapon is provided. The light filter antenna includes a housing, a filter unit disposed within the housing, and one or more radar antennae deposited on a surface of the filter unit. The filter unit can be configured to prevent light having a threshold wavelength from passing through the filter unit. The one or more radar antennae can be configured to capture a velocity of a projectile fired from the weapon. A method of manufacturing a light filter antenna is provided. The method includes depositing one or more radar antennae on a filter unit and installing the filter unit within a housing. The filter unit can be configured to prevent light having a threshold wavelength from passing through the filter unit. The one or more radar antennae can be configured to capture a velocity of a projectile fired from a weapon.

20 Claims, 4 Drawing Sheets

(56) References Cited

U.S. PATENT DOCUMENTS

| | | | | |
|---|---|---|---|---|
| 5,103,567 | A | 4/1992 | Loving | |
| 5,570,094 | A * | 10/1996 | Armstrong | G01S 13/66 342/107 |
| 6,378,367 | B1 * | 4/2002 | Dilz, Jr. | F41B 5/14 73/488 |
| 6,644,111 | B2 * | 11/2003 | Cytron | G01P 3/685 356/28 |
| 6,666,089 | B2 * | 12/2003 | Dilz, Jr. | A63B 71/00 73/488 |
| 7,643,132 | B2 * | 1/2010 | Holmberg | F41G 1/473 356/5.02 |
| 7,825,850 | B2 * | 11/2010 | Frick | G01S 11/023 73/167 |
| 7,855,691 | B2 | 12/2010 | Yonak et al. | |
| 8,773,300 | B2 * | 7/2014 | Stratis | F41G 7/2246 342/54 |
| 8,935,958 | B2 * | 1/2015 | Downing | G01P 3/665 73/167 |
| 9,038,901 | B2 * | 5/2015 | Paterson | F41G 3/08 235/407 |
| 9,129,295 | B2 * | 9/2015 | Border | G02B 5/23 |
| 9,250,035 | B2 * | 2/2016 | Sullivan | F41G 1/44 |
| 9,482,490 | B2 * | 11/2016 | Roemerman | F41G 7/001 |
| 9,568,583 | B2 * | 2/2017 | Caplan | F41G 7/226 |
| 9,879,963 | B2 * | 1/2018 | Sullivan | F41A 21/34 |
| 10,054,846 | B1 * | 8/2018 | Boerup | G03B 15/06 |
| 10,274,286 | B2 * | 4/2019 | Maryfield | G02B 23/16 |
| 10,458,754 | B2 * | 10/2019 | Miller | F41G 3/165 |
| 10,756,441 | B2 * | 8/2020 | Gambahaya | H01Q 1/1207 |
| 10,788,290 | B2 * | 9/2020 | Gallery | F41G 3/2694 |
| 10,883,809 | B1 * | 1/2021 | Neeb | F42C 11/065 |
| 11,143,491 | B2 * | 10/2021 | Chen | H04N 23/55 |
| 11,287,638 | B2 * | 3/2022 | DeAngelis | F41G 1/345 |
| 11,320,447 | B2 * | 5/2022 | Itz | G01P 3/64 |
| 11,473,873 | B2 * | 10/2022 | Hamilton | G02B 23/16 |
| 11,480,781 | B2 * | 10/2022 | Hamilton | F41G 1/38 |
| 11,933,585 | B2 * | 3/2024 | Sullivan | F42B 12/72 |
| 11,994,364 | B2 * | 5/2024 | Hamilton | F41G 3/06 |
| 12,000,674 | B1 * | 6/2024 | Ambs | F41G 3/06 |
| 12,078,793 | B2 * | 9/2024 | Masarik | F41G 11/001 |
| 12,264,895 | B2 * | 4/2025 | Heeke | G01P 3/685 |
| 2008/0278393 | A1 | 11/2008 | Gottwald et al. | |
| 2012/0097741 | A1 * | 4/2012 | Karcher | F41G 1/473 235/404 |
| 2012/0145785 | A1 * | 6/2012 | Scrogin | F41G 3/065 235/404 |
| 2015/0207236 | A1 * | 7/2015 | Felic | H01Q 21/065 343/753 |
| 2016/0238338 | A1 * | 8/2016 | Itz | F41B 6/003 |
| 2017/0097216 | A1 * | 4/2017 | Sullivan | F42B 10/00 |
| 2020/0166309 | A1 * | 5/2020 | Panas | F41G 3/005 |
| 2023/0067343 | A1 * | 3/2023 | Zhang | H01Q 9/30 |

FOREIGN PATENT DOCUMENTS

| | | | |
|---|---|---|---|
| EP | 3667813 | A1 | 6/2020 |
| EP | 4084224 | A1 | 11/2022 |

* cited by examiner

LASER FILTER ANTENNA

CROSS-REFERENCE TO RELATED APPLICATIONS

Not Applicable.

BACKGROUND

Technical Field

The present disclosure relates to a light filter antenna for use with weapons.

Description of Related Art

The effectiveness of rifles for sport or in warfare is improved with greater accuracy. But accuracy, or the ability to hit a target, is impacted by many factors. For example, the muzzle velocity is particularly important to the accuracy of a shot. A bullet travels in a substantially parabolic path. Gravity is pulling the bullet downwards, while the explosive force of the propellant creates acceleration on the bullet in the horizontal. Once the bullet exits a rifle's barrel, it has achieved a muzzle velocity, and the accelerative force of the propellant, usually gunpowder, dissipates, and the bullet achieves its muzzle velocity.

Laser systems for use in battlefield conditions have become more and more prevalent. These laser systems are employed for target illumination and tracking or for ranging. Such laser systems may also be employed for the intentional blinding of personnel or sensors. These laser illuminators may be both from friendly forces and from enemy forces. These personnel require some eye protection from this laser illumination. Laser protection optical filters are used to protect both human eyes and optical sensors from laser radiation, including from the risk of permanent damage or from the risk of dazzling or distraction.

Currently, standalone devices are used to measure the velocity of projectiles and filter harmful lasers directed at optical systems. However, the current standalone devices are cumbersome. Therefore, a need exists for an integrated light filter antenna that measures the velocity of a projectile and filters out harmful (or unwanted) laser illumination.

BRIEF SUMMARY

This summary provides a discussion of aspects of certain embodiments of the invention. It is not intended to limit the claimed invention or any of the terms in the claims. The summary provides some aspects, but there are aspects and embodiments of the invention that are not discussed here.

In one aspect, a light filter antenna configured to be used with a weapon is provided. The light filter antenna can include a housing, a filter unit disposed within the housing, and one or more radar antennae deposited on a surface of the filter unit. The filter unit can be configured to prevent light having a threshold wavelength from passing through the filter unit. The one or more radar antennae can be configured to capture a velocity of a projectile fired from the weapon.

In one embodiment, the one or more radar antennae can be deposited on the surface of the filter unit via vapor deposition. Alternatively, the one or more radar antennae are deposited on the surface of the filter unit via sputtering.

In another embodiment, the one or more radar antennae can define an open space on the filter unit, allowing light having a wavelength outside the threshold wavelength to bypass the filter unit.

In yet another embodiment, the light having the threshold wavelength can be a laser.

In another embodiment, the one or more radar antennae can include a Doppler radar. The Doppler radar can operate at a frequency to detect the projectile near a distal end of a barrel on the weapon.

In another embodiment, the light filter antenna can also include a coupler for mounting the light filter antenna to the weapon.

In yet another embodiment, the housing can include a coupler configured to integrate the light filter antenna into an optical system of the weapon. The light filter antenna can share electrical power with the optical system of the weapon.

In another embodiment, the housing can include a conductive element exposed on an outer surface of the housing. The conductive element can be electrically connected to the one or more radar antennae. The light filter antenna can also include a power supply connected to the one or more radar antennae via the conductive element. Additionally, or alternatively, the light filter antenna can also include a processor connected to the one or more radar antennae via the conductive element.

In another aspect, a light filter antenna configured to be used with a weapon is provided. The light filter antenna can include a housing, a filter unit disposed within the housing, and one or more radar antennae deposited on a surface of the filter unit. The filter unit can be configured to prevent light having a threshold wavelength from passing through the filter unit. The one or more radar antennae can be configured to capture a velocity of a projectile fired from the weapon. The conductive element can be electrically connected to the one or more radar antennae.

In one embodiment, the conductive element is configured to connect to a power supply. Additionally, or alternatively, the conductive element is configured to a processor.

In another embodiment, the one or more radar antennae can be deposited on the surface of the filter unit via vapor deposition. Alternatively, the one or more radar antennae are deposited on the surface of the filter unit via sputtering.

In another embodiment, the one or more radar antennae can define an open space on the filter unit, allowing light having a wavelength outside the threshold wavelength to bypass the filter unit.

In yet another embodiment, the light having the threshold wavelength can be a laser.

In another embodiment, the one or more radar antennae can include a Doppler radar. The Doppler radar can operate at a frequency to detect the projectile near a distal end of a barrel on the weapon.

In another embodiment, the light filter antenna can also include a coupler for mounting the light filter antenna to the weapon.

In yet another embodiment, the housing can include a coupler configured to integrate the light filter antenna into an optical system of the weapon. The light filter antenna can share electrical power with the optical system of the weapon.

In another aspect, a method of manufacturing a light filter antenna is provided. The method can include depositing one or more radar antennae on a filter unit and installing the filter unit within a housing. The filter unit can be configured to prevent light having a threshold wavelength from passing through the filter unit. The one or more radar antennae can be configured to capture a velocity of a projectile fired from a weapon.

In one embodiment, depositing the one or more radar antennae on the filter unit can include vapor deposition.

Additionally, or alternatively, depositing the one or more radar antennae on the filter unit can include sputtering.

In another embodiment, installing the filter unit can include forming an electrical connection between the one or more radar antennae and a conductive element exposed on an outer surface of the housing.

In another embodiment, the method can also include installing a coupler on a lateral surface of the housing. The coupler can be configured to mount the light filter antenna to a weapon.

In yet another embodiment, the method can also include installing a coupler on an end of the housing. The coupler can be configured to integrate the light filter antenna into an optical system of a weapon.

BRIEF DESCRIPTION OF THE DRAWINGS

The preceding aspects and many of the attendant advantages of the present technology will become more readily appreciated by reference to the following Detailed Description when taken in conjunction with the accompanying simplified drawings of example embodiments. The drawings briefly described below are presented for ease of explanation and do not limit the scope of the claimed subject matter.

DETAILED DESCRIPTION

Figure 1:
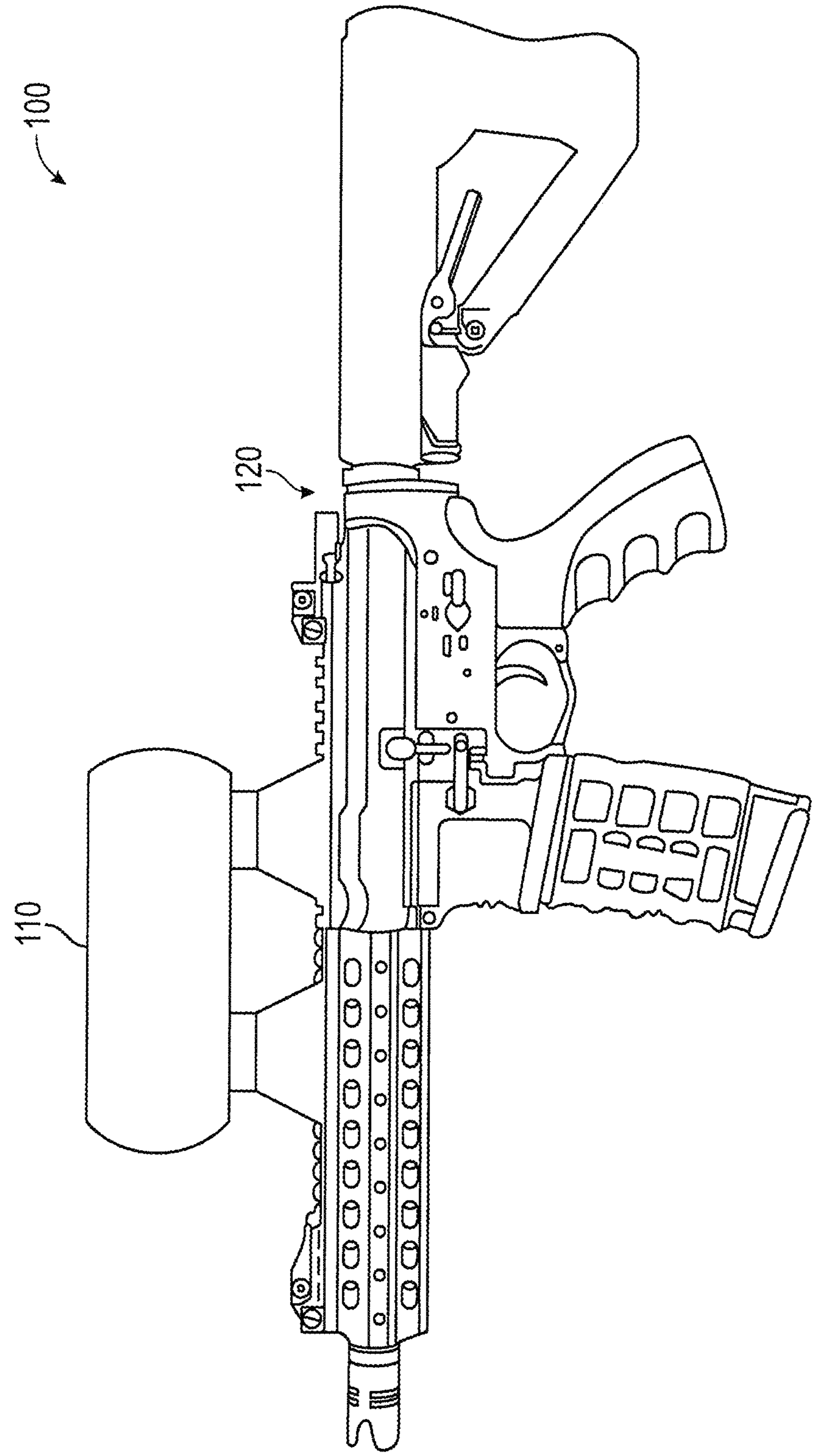
FIG. 1 depicts an embodiment of a light filter antenna mounted on a weapon.

With reference to FIG. 1, an embodiment 100 of a light filter antenna 110 mounted on a weapon 120 is illustrated. The light filter antenna 110 can be used as a standalone component on the weapon 120. Alternatively, the light filter antenna 110 can be incorporated into an existing optical system on the weapon 120. As explained in more detail below, the light filter antenna 110 is configured to prevent a predetermined wavelength of light (e.g., a laser) from bypassing a lens filter in the light filter antenna 110, which advantageously prevents a user's (or sensor's) visual from being obstructed. Additionally, the light filter antenna 110 is configured to capture a velocity of a projectile fired from the weapon 120, which advantageously aids in improving the accuracy of the weapon 120. As explained below, the integration of the radar antenna with the lens filter minimizes the encumbrance on weapon 120.

Figure 2:
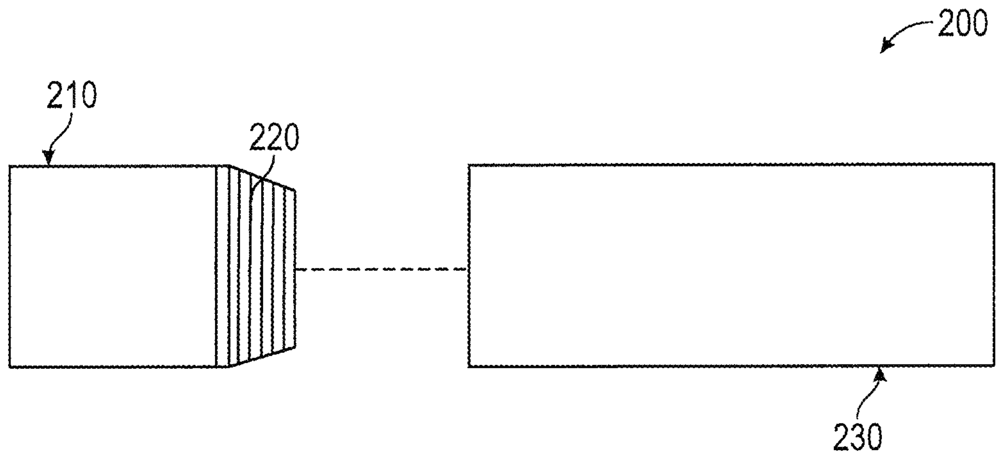
FIG. 2 depicts an embodiment of a light filter antenna connected to a weapon's optical system.

Turning to FIG. 2, an embodiment 200 of a light filter antenna 210 connecting to an optical system 230 of a weapon is illustrated. In the illustrative embodiment, the light filter antenna 210 comprises a coupler 220 at an end of the light filter antenna 210. The coupler 220 can be a threaded surface that is configured to connect to a corresponding threaded surface of the optical system 230. In the illustrative embodiment, the coupler 220 is a male-threaded surface that is configured to connect to a female-threaded surface (not illustrated) of the optical system. Alternatively, the coupler 220 can be a female-threaded surface that is configured to connect to a male-threaded surface of the optical system.

Figure 3:
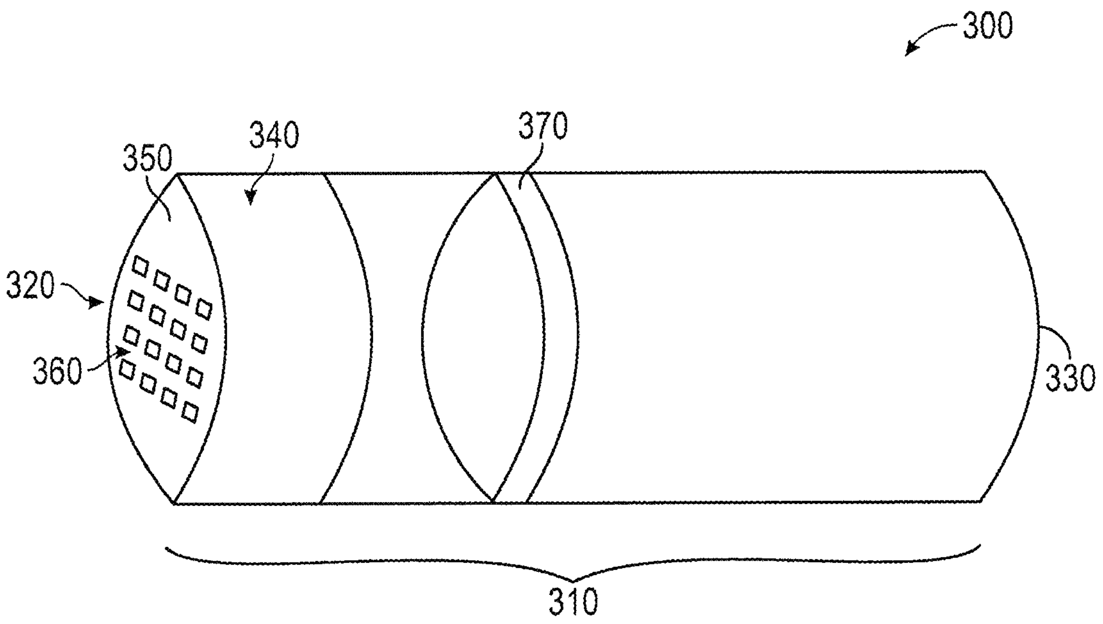
FIG. 3 depicts an embodiment of an integrated light filter antenna and optical system.

Referring to FIG. 3, an integrated light filter antenna and optical system 300 are illustrated. The integrated system 300 comprises a light filter antenna 340 and an objective lens 370 formed within a housing (or encasing) 310. In the illustrative embodiment, the light filter antenna 340 is disposed at a first end 320 of the housing 310, and the objective lens 370 is disposed at (or near) a second end 330 of the housing 310. The light filter antenna 340 includes a lens filter 350 and one or more radar antennae 360 deposited on a surface of the lens filter 350. In the illustrative embodiment, light enters system 300 at the first end 320. The filter lens 350 prevents a predetermined (or threshold) wavelength of light from passing through to the second end 330. Additionally, the one or more radar antennae 360 are configured to (1) emit a radar pulse from the second end 320 of the housing to detect an object (e.g., a projectile fired from a weapon) and (2) receive the radar pulse returning from the detected object. In one example, a user is positioned at the second end 330 of the housing and is able to obtain a visual of a target by looking through the integrated system 300. As explained below, the filter lens 350 has a sufficient amount of space unencumbered by the one or more radar antennae 360 to allow a sufficient amount of light for the user to visualize the target.

Figure 4:
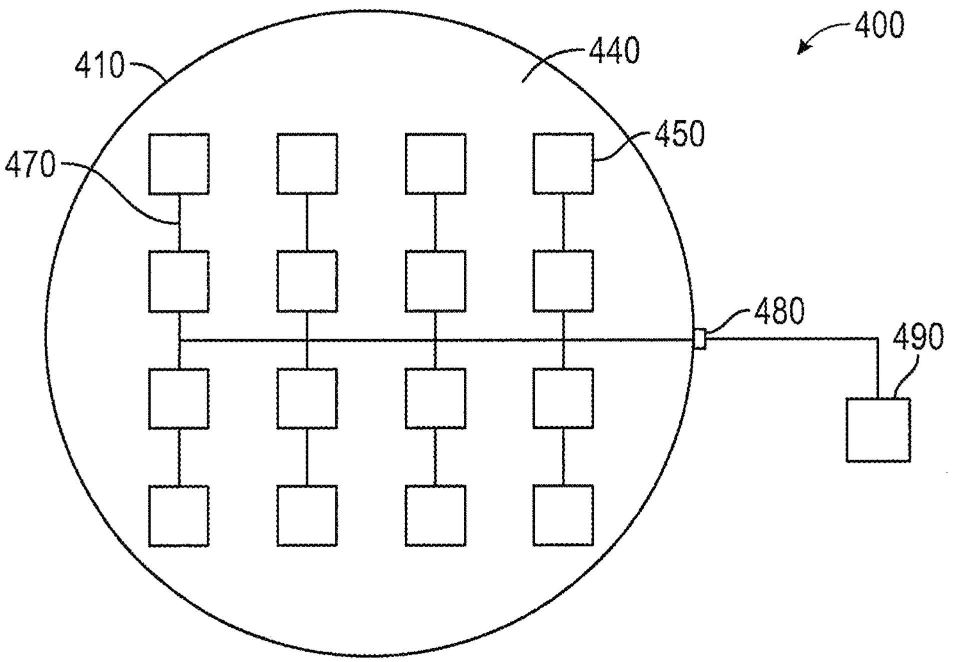
FIG. 4 depicts an embodiment of a laser filter antenna.

Turning to FIG. 4, an embodiment of a light filter antenna 400 is illustrated. The laser filter antenna 400 comprises a filter lens 440 disposed within a housing 410. One or more radar antennae 450 are deposited on the filter lens 440. The one or more radar antennae 440 are electrically connected via tracing (or a printed circuit) 470 to a conductive element 480 in the housing 410. In the illustrative embodiment, the conductive element 480 is exposed on an outer surface of the housing 410. A power supply (or processor) 490 can be configured to connect to the conductive element 480. As mentioned above, the light filter antenna 400 is configured such that the lens filter 440 has a sufficient amount of space unencumbered by the one or more radar antennae 450 to allow a sufficient amount of light for the user to visualize the target. For example, in the illustrative embodiment, the sufficient amount of space unencumbered by the one or more radar antennae 450 can be expressed by the following equations:

$$A_s = \theta \cdot A_g \tag{1}$$

$$A_s = A_g - \Sigma A_a \tag{2}$$

where $A_s$ represents the sufficient amount of unencumbered space on the lens filter, θ represents the coefficient of sufficient amount of unencumbered space, $A_a$ represents the area of a radio antenna, and $A_g$ represents the total area of the lens filter. θ can be between about 0.4 to about 0.99. For example, a lens filter having a 30 mm diameter and sixteen radio antennae, each having a 9 $mm^2$ area, would produce a θ of about 0.796 and a sufficient amount of space unencumbered of about 562.66 $mm^2$.

Figure 5:
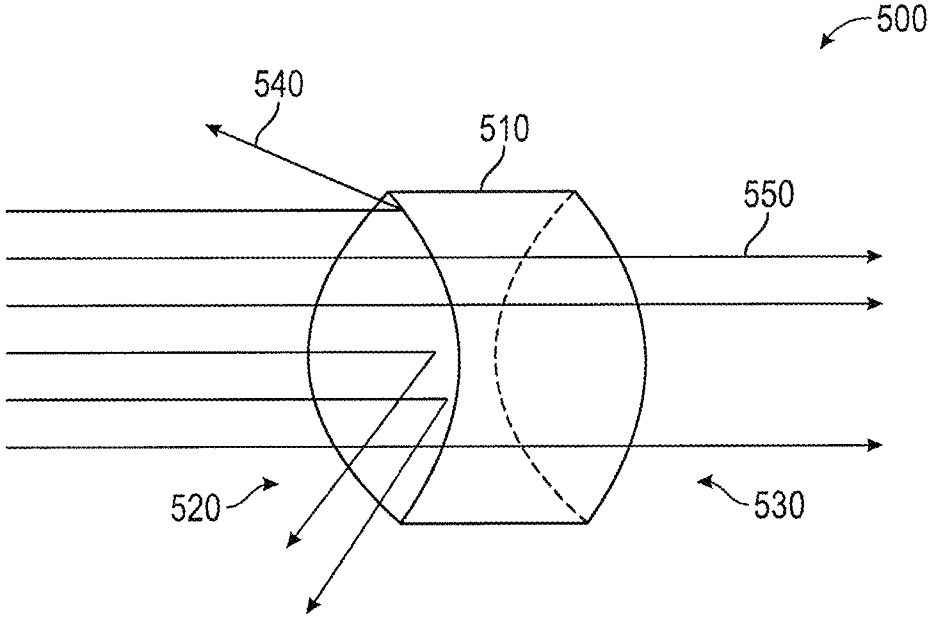
FIG. 5 depicts an embodiment of a lens filter.

With reference to FIG. 5, an embodiment of a light filter antenna 500 is illustrated. The light filter antenna 500 includes a lens filter 510 configured to selectively allow light to pass through the light filter antenna 500. As seen, light encounters the lens filter 510 at a first end 520 of the light filter antenna 500. The lens filter 510 reflects the light having a predetermined wavelength 540 and allows the light having wavelengths outside of the predetermined wavelength to pass through to the second end 530 of the light filter antenna 500. The predetermined wavelength 540 can be any range within the visible light spectrum. For example, the lens filter 510 can be configured to prevent light having a wavelength between 380-450 nm, 450-485 nm, 485-500 nm, 500-565 nm, 565-590 nm, 590-625 nm, 625-75 nm, or any other range between 380-750 nm.

Figure 6:
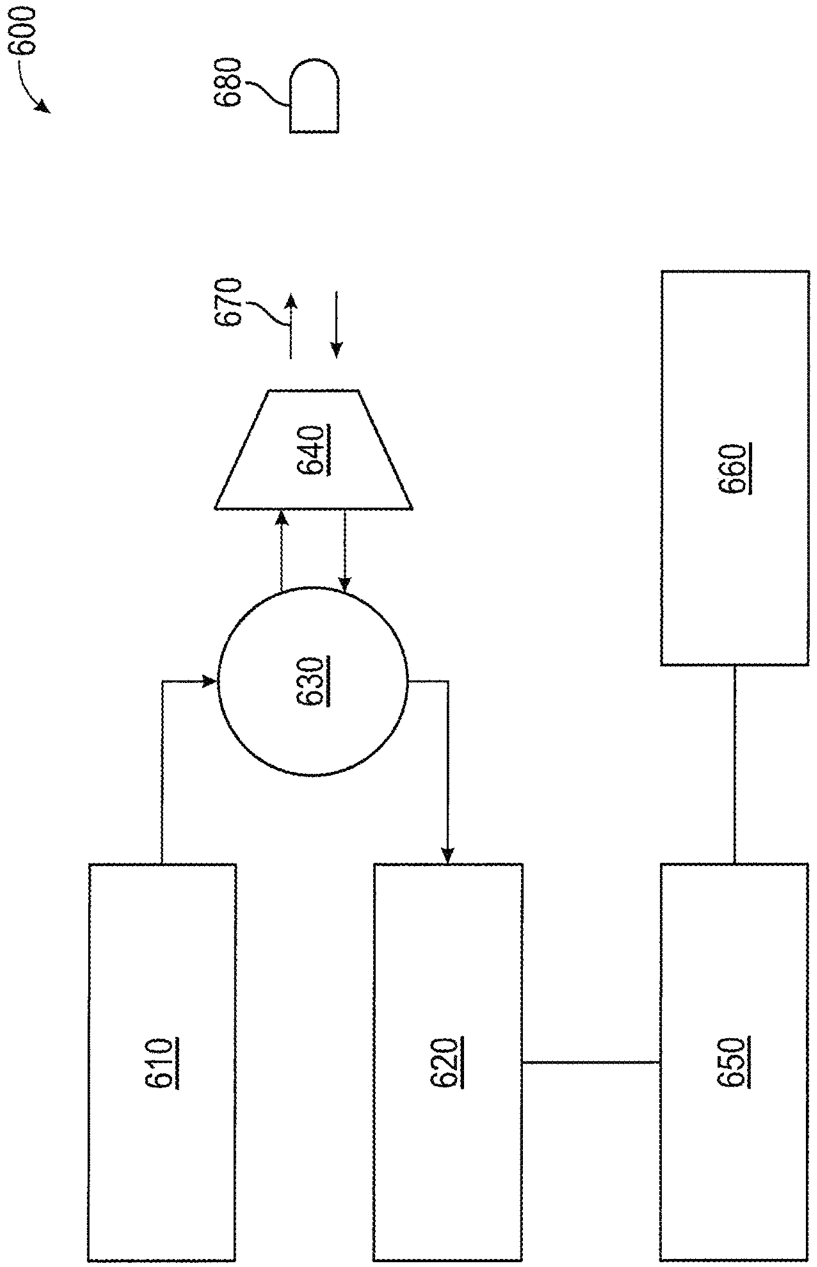
FIG. 6 depicts a block diagram of an embodiment of an antenna.

Turning to FIG. 6, an example of a block diagram of a radar antenna 600 for capturing the velocity of a projectile 680 is illustrated. The radar antenna 600 includes a transmitter 610 and a receiver 620 coupled to an antenna 640 via a switch 630. Additionally, a recorder 650 is coupled to the receiver 620, and a processor 660 is coupled to the recorder 650. The radar antenna 600 functions by the transmitter 610 sending an electrical pulse (or signal) 670 through the antenna 640 at the projectile 680. After the transmitter 610 sends the signal, the switch 630 breaks the circuit between the transmitter 610 and the antenna 640 and forms a circuit between the receiver 620 and the antenna 640. When the signal encounters the projectile 680, and returns to the radar antenna 600, the antenna 640 receives the signal, which is transmitted to the receiver 620. The recorder 650 logs the data captured from the signal, which is transmitted to the processor 660 for computation and visualization. Although the radar antenna 600 is depicted as a combined transmitter-receiver antenna, the radar antenna 600 may be constructed such that the transmitter and receiver each have an antenna to perform their respective functions.

Additionally, the section headings herein are provided for consistency with the suggestions under 37 C.F.R. § 1.77 or to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that a particular technology is prior art to any embodiment(s) in this disclosure. Neither is the "Summary" a characterization of the embodiment(s) outlined in issued claims.

Furthermore, any reference in this disclosure to "invention" in the singular should not be used to argue that there is only a single point of novelty in this disclosure. Multiple embodiments may be set forth according to the limitations of the multiple claims issuing from this disclosure. Such claims accordingly define the embodiment(s) and their equivalents that are protected thereby. In all instances, the scope of such claims shall be considered on their own merits in light of this disclosure but should not be constrained by the headings set forth herein.

Moreover, the Abstract is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the preceding Detailed Description, it can be seen that various features may be grouped in a single embodiment to streamline the disclosure. This method of disclosure is not to be interpreted as reflecting an intention that the claimed embodiments require more features than are expressly recited in each claim. Instead, as the claims reflect, the inventive subject matter lies in less than all features of a single disclosed embodiment. Thus, the following claims are incorporated into the Detailed Description, with each claim standing on its own as a separate embodiment.

What is claimed is:

1. A light filter antenna configured to be used with a weapon, the light filter antenna comprising:
- a housing;
- a filter unit disposed within the housing, wherein the filter unit is configured to prevent light having a threshold wavelength from passing through the filter unit; and
- one or more radar antennae deposited on a surface of the filter unit, wherein the one or more radar antennae are configured to capture a velocity of a projectile fired from the weapon.

2. The light filter antenna of claim 1, wherein the one or more radar antennae are deposited on the surface of the filter unit via vapor deposition.

3. The light filter antenna of claim 1, wherein the one or more radar antennae are deposited on the surface of the filter unit via sputtering.

4. The light filter antenna of claim 1, wherein the one or more radar antennae define an open space on the filter unit, thereby allowing light having a wavelength outside the threshold wavelength to bypass the filter unit.

5. The light filter antenna of claim 1, wherein the light having the threshold wavelength is a laser.

6. The light filter antenna of claim 1, wherein the one or more radar antennae comprise a Doppler radar.

7. The light filter antenna of claim 6, wherein the Doppler radar operates at a frequency to detect the projectile near a distal end of a barrel on the weapon.

8. The light filter antenna of claim 1, further comprising a coupler for mounting the light filter antenna to the weapon.

9. The light filter antenna of claim 1, wherein the housing comprises a coupler configured to integrate the light filter antenna into an optical system of the weapon.

10. The light filter antenna of claim 9, wherein the light filter antenna shares electrical power with the optical system of the weapon.

11. A light filter antenna configured to be used with a weapon, the light filter antenna comprising:
- a housing comprising a conductive element exposed on an outer surface of the housing;
- a filter unit disposed within the housing, wherein the filter unit is configured to prevent light having a threshold wavelength from passing through the filter unit; and
- one or more radar antennae deposited on a surface of the filter unit, wherein the one or more radar antennae are configured to capture a velocity of a projectile fired from the weapon, further wherein the conductive element is electrically connected to the one or more radar antennae.

12. The light filter antenna of claim 11, further comprising a power supply connected to the one or more radar antennae via the conductive element.

13. The light filter antenna of claim 11, further comprising a processor connected to the one or more radar antennae via the conductive element.

14. The light filter antenna of claim 11, wherein the one or more radar antennae comprise a Doppler radar, further wherein the Doppler radar operates at a frequency to detect the projectile near a distal end of a barrel on the weapon.

15. A method of manufacturing a light filter antenna, the method comprising:
- depositing one or more radar antennae on a filter unit, wherein the filter unit is configured to prevent light having a threshold wavelength from passing through the filter unit, further wherein the one or more radar antennae are configured to capture a velocity of a projectile fired from a weapon; and
- installing the filter unit within a housing.

16. The light filter antenna of claim 15, wherein depositing the one or more radar antennae on the filter unit comprises vapor deposition.

17. The light filter antenna of claim 15, wherein depositing the one or more radar antennae on the filter unit comprises sputtering.

18. The light filter antenna of claim 15, wherein installing the filter unit comprises forming an electrical connection between the one or more radar antennae and a conductive element exposed on an outer surface of the housing.

19. The light filter antenna of claim 15, further comprising installing a coupler on a lateral surface of the housing, wherein the coupler is configured to mount the light filter antenna to a weapon.

20. The light filter antenna of claim 15, further comprising installing a coupler on an end of the housing, wherein the coupler is configured to integrate the light filter antenna into an optical system of a weapon.

* * * * *